Aug. 14, 1951

W. W. HAMILL 2,564,220

CONTROL MEANS FOR POWER UNITS, INCLUDING
INTERNAL-COMBUSTION ENGINES
AND GEAR BOXES

Filed Jan. 27, 1948

Inventor
William Wilson Hamill
By
William A. Davis.
Attorney

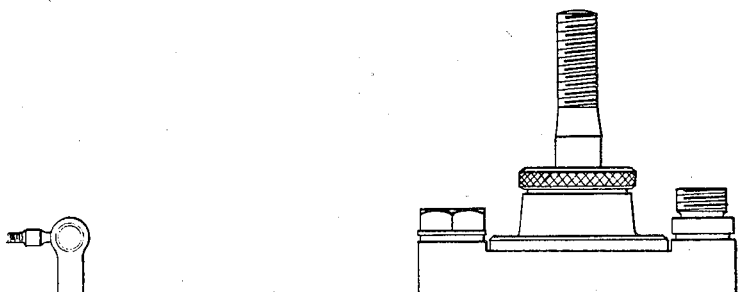

Patented Aug. 14, 1951

2,564,220

UNITED STATES PATENT OFFICE 2,564,220

CONTROL MEANS FOR POWER UNITS, INCLUDING INTERNAL - COMBUSTION ENGINES AND GEARBOXES

William Wilson Hamill, Little Aston, England

Application January 27, 1948, Serial No. 4,496
In Great Britain April 14, 1947

3 Claims. (Cl. 74—472)

This invention relates to control means for engines and transmissions and is particularly suitable for marine uses so that an operator controlling an engine may effect a change from ahead to astern or vice-versa though it is applicable to other uses of a like kine where it may be appropriate.

The object of the invention is a simple, convenient and reliable device for effecting changes in transmission by power.

Power means are adapted to be operated by pressure fluid which may either be extraneous to the power unit (as by a separate oil, air, or vacuum pump), or derived from a source of pressure inherent in the internal combustion engine such as the lubricating oil system. Where the lubricating oil system is utilised, the power means are preferably connected in series with the lubricating oil circuit from the oil pump through the power means to an oil cooler if embodied, and thence to the bearings and/or sump, to be finally recirculated.

Reference may be had to the accompanying drawings in which:

Figure 2 is an elevation corresponding to Figure 1.

Figure 3 is a sectional elevation looking at right angles to Figures 1 and 2.

Figure 1:
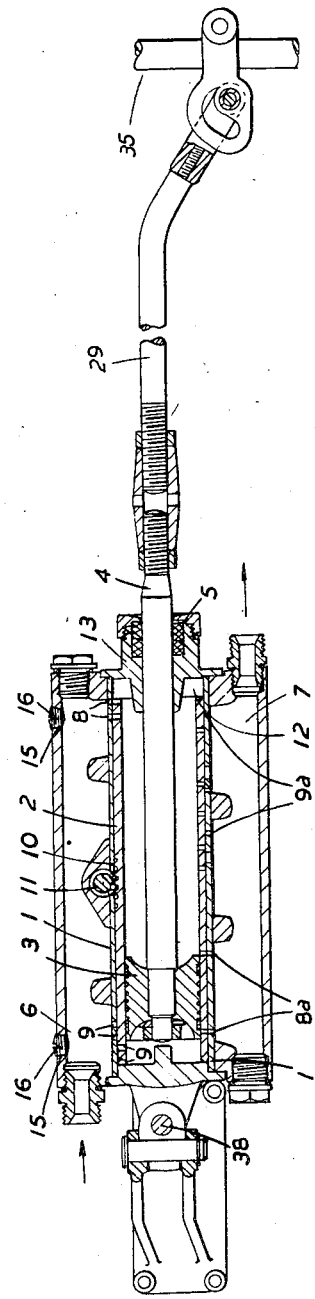
Figure 1 is a sectional elevation of power means included in apparatus according to the invention.

According to one convenient embodiment of the invention applied to an internal combustion engine in unit with a gear box arranged to change the direction of rotation of the output transmission shaft, there is provided power means interjected as aforesaid into the lubricating oil system, a servo cylinder adapted to operate the control organ or organs, and a mechanical coupling for co-ordinating the movement of a cam with the movement of a valve which controls the pressure fluid inlets and outlets associated with the servo cylinder.

One desirable construction of servo cylinder illustrated in Figure 1 includes an outer ported stationary tube 1, a ported sleeve valve 2 slidable therein and acting as the power cylinder, and an inner double-acting piston 3 slidable within the sleeve valve and provided with a piston rod 4 surrounded by a seal 5, for transmission of the movement of the piston to the gear lever or other expedient adopted to move the gear. The outer tube 1 is provided with two diametrically arranged segmental jackets 6, 7 having pipe connections for coupling to the lubricating oil system, the jacket 6 communicating with the fluid inlets to and the jacket 7 with the fluid outlets from the outer tube.

In the periphery of the outer tube and the sleeve valve are formed groups of ports or passages, one group comprising inlet 8 and scavenge 8a operating to control movement of the piston in one direction and the other group comprising inlet 9 and scavenge 9a performing a like function for piston displacement in the opposite direction, the cooperating ports having such axial relationship that they are brought selectively in alignment with the relevant passages for ahead and astern by an endwise movement of the sleeve valve, a preferred mechanism for which incorporates a rack 10 on the periphery of the sleeve valve and a rotatable pinion 11 engaging therewith. The registering ports are aligned circumferentially as well as axially by the rack and pinion and provision is made for the correct circumferential position of the sleeve valve relative to the outer tube during assembly by means of a dowel 12 on the bearing cap 13 next the fluid sealing device of the piston rod 4. To enable proper registration of the passages in the outer tube with those in the sleeve valve to be checked after assembly of the parts, a sight hole 15 closed by a plug 16 is provided at each end of the inlet jacket in line with the inlet passages in the outer tube. When the sleeve valve is moved to one of its two end positions, the inlet and scavenge ports in the one half of the cylinder are closed relative to the ports in the outer tube, and at the same time the inlet and scavenge ports on the other half of the tube are opened to admit pressure fluid and drive the piston to the opposite end of the cylinder.

The device adopted to move the speed control organ or organs of the engine such as the throttle and/or ignition control, or fuel pump regulator, preferably consists of a peripheral cam 17, Figures 2 and 3, mounted on a shaft 18 manually actuated, and a pivoted lever 19 spring pressed against the periphery of the cam, turning of the cam in one direction moving the lever to increase engine revolutions and turning in an opposite sense serving to reduce engine speed; 14 is a rebate in the cam for contact with an abutment (not shown) to limit angular movement of the cam. On the cam shaft is also mounted a lever, grooved pulley 20, chain and sprocket, or other expedient by which the shaft can be turned from ahead to reverse position or vice-versa either by direct manual operation or from a distant point.

A suitable mechanical device for coupling the speed control device to the pinion operating the sleeve valve and the power means, comprises a form of Geneva stop 21 having a sloted arm 22 fast with the pinion shaft, and a projection or peg 23 on the face of the cam for engagement with the slot 24. A spring detent consisting of a spring plunger 25 and two notches 26, 27 in the cam periphery is used to station the cam in the neutral positions. The angular displacement of the Geneva stop arm during its movement (approximately 90°) from one extreme position to the other extreme position uses only a portion of the periphery of the cam which is so shaped that during such angular displacement of the stop arm, the control organ or organs is or are in such position as will produce low engine speed, the effect being such that as the cam approaches, passes through and recedes from the gear-change zone, low engine speed enables the change of gear to be made quickly and with minimum shock. Beyond the said zone, the cam has a contour adapted progressively to increase the speed of the engine as the cam shaft continues to turn, by suitably displacing the lever in contact with its periphery. If desired, the cam may have two tracks side by side, one for throttle or equivalent control and the other for ignition control, co-operating to regulate engine speed. The point of articulation 28 of the control organ rod 29 to the lever operated by the cam will rise or fall slightly during its motion according to the engagement required, and to avoid resultant disturbance of the throttle setting, the control organ rod 29 is set at a suitable height by means of a telescopic spindle 30 to compensate for the angular movement.

Assuming the power piston is at one end of the cylinder and the flank of the Geneva stop arm is in contact with a circular surface 31 on the cam or a part fast with the cam shaft, movement of the operator-operated control device 20 from a given throttle opening will first reduce engine revolutions in the manner described until the operating peg 23 on the cam face engages the slot on the arm 22 and turns the latter and pinion 11 with a resultant sliding motion of the sleeve valve-cum-cylinder 2, which firstly cuts off the pressure fluid from one face of the piston and then by further movement brings the relevant ports into register so that the pressure fluid can act on the other side of the piston. The full registration of the several ports occurs when the stop has completed its angular motion, the gear lever is thereby operated, the relevant flank of the stop bears against the circular surface of the cam or part fast with the cam shaft, and the sleeve valve is thereby retained in registering position during subsequent angular movement of the cam and resultant operation of the fuel control throttle and/or ignition levers. Means may be provided when desired for cutting out the power system by short circuiting the power cylinder to allow the gear lever to be operated by hand.

Having thus described my invention, what I claim is:

1. Control means for an engine and a fluid operated servomotor including a cylinder and a piston for actuating forward or reverse driving means, means for controlling admittance and exhaust of pressure fluid to and from said cylinder, a housing enclosing the cylinder, an operator-controlled cam mounted for angular movement on said housing, an engine speed control actuated by the angular movement of the cam, a Geneva gear element movable with the cam, and another Geneva element operated by the first Geneva element to transmit rotatory movement to actuate the pressure fluid control means.

2. Control means according to claim 1 having pressure fluid control means which include a tube slidable in the housing, fluid passages in the housing communicating with the periphery of the tube, peripheral passages in the tube adapted to be brought into and out of register with the housing passages, a shaft fast with the second Geneva gear element, a toothed member fast with said shaft, and rack teeth on the tube in mesh with the toothed member.

3. Control means for an engine and a fluid operated servomotor for actuating forward or reverse driving means including a housing, a power cylinder in the form of a tube slidable in the housing, means for controlling admittance and release of pressure fluid to and from the power cylinder including fluid passages in the housing communicating with the periphery of the tube, peripheral passages in the tube adapted to be brought into and out of register with the housing passages, an operator-controlled cam mounted for angular movement on the housing, an engine speed control means actuated by angular movement of the cam, Geneva gear elements movable with the cam and adapted to transmit rotary motion, and means for translating rotatory motion of the operated element of the Geneva gear elements into sliding motion of the said tube, said cam and Geneva gear elements being arranged to co-act for a change of drive so that the cam when turned moves the engine speed control to diminish engine speed, and the Geneva gear elements move the said tube to disengage one drive and engage the other drive while engine speed is low.

WILLIAM WILSON HAMILL.

REFERENCES CITED

The following references are of record in the file of this patent:

UNITED STATES PATENTS

| Number | Name | Date |
|---|---|---|
| 1,217,117 | Curtis | Feb. 20, 1917 |
| 1,667,842 | Coykendall | May 1, 1928 |
| 1,882,805 | Gillett | Oct. 18, 1932 |
| 2,056,006 | Hodgkins | Sept. 29, 1936 |
| 2,378,474 | Gasche | June 19, 1945 |
| 2,411,463 | Pozgoy | Nov. 19, 1946 |
| 2,420,856 | Brill | May 20, 1947 |

FOREIGN PATENTS

| Number | Country | Date |
|---|---|---|
| 340,848 | Germany | Sept. 20, 1921 |
| 807,613 | France | Jan. 16, 1937 |